(12) United States Patent
Shimizu et al.

(10) Patent No.: US 8,508,808 B2
(45) Date of Patent: Aug. 13, 2013

(54) OPTICAL SCANNING AND IMAGE FORMING APPARATUS WITH A FREE-SLIDING UNIT FOR THERMAL EXPANSION

(75) Inventors: Kenichi Shimizu, Kawasaki (JP); Atsuhiko Ogawa, Atsugi (JP)

(73) Assignee: Ricoh Company, Ltd., Tokyo (JP)

( * ) Notice: Subject to any disclaimer, the term of this patent is extended or adjusted under 35 U.S.C. 154(b) by 885 days.

(21) Appl. No.: 12/388,624

(22) Filed: Feb. 19, 2009

(65) Prior Publication Data
US 2009/0219582 A1 Sep. 3, 2009

(30) Foreign Application Priority Data

Feb. 28, 2008 (JP) ................. 2008-048040

(51) Int. Cl.
*G02B 26/12* (2006.01)
(52) U.S. Cl.
USPC ...................................... 358/474; 359/221.2
(58) Field of Classification Search
None
See application file for complete search history.

(56) References Cited

U.S. PATENT DOCUMENTS

| | | | |
|---|---|---|---|
| 7,826,116 B2 | 11/2010 | Itabashi | |
| 2006/0132880 A1* | 6/2006 | Amada et al. | 359/196 |
| 2007/0206256 A1* | 9/2007 | Itabashi | 359/196 |
| 2009/0323147 A1 | 12/2009 | Amada et al. | |

FOREIGN PATENT DOCUMENTS

| | | |
|---|---|---|
| JP | 2002-169115 | 6/2002 |
| JP | 2005-141167 | 6/2005 |
| JP | 2005-234172 | 9/2005 |
| JP | 2006-023338 | 1/2006 |
| JP | 2006-215397 | 8/2006 |
| JP | 2007-233211 | 9/2007 |
| JP | 2009-217091 A | 9/2009 |
| JP | 2009-217153 A | 9/2009 |
| JP | 2010-8902 A | 1/2010 |

OTHER PUBLICATIONS

JP-2007233211—translation.*
JP-2005234172—abstract.*

* cited by examiner

*Primary Examiner* — Fan Zhang
(74) *Attorney, Agent, or Firm* — Dickstein Shapiro LLP (57) ABSTRACT

An optical scanning apparatus has: a deflection unit that scans beams emitted from a plurality of laser light sources; an imaging unit having one or more optical elements for imaging beams scanned by the deflection unit; and a supporting unit having a higher rigidity than a rigidity of the imaging unit. The supporting unit has a pair of receiving members that support the imaging unit, in a sub-scanning direction, near both ends, as seen in a main scanning direction, of the imaging unit. The optical scanning apparatus also has; a bend-adjustment unit that corrects bend. The bend-adjustment unit is disposed on the supporting unit at a plurality of positions along the main scanning direction. The optical scanning apparatus further has a free-sliding unit for securing free expansion of the imaging unit due to temperature changes thereof.

9 Claims, 7 Drawing Sheets

INTERMEDIATE MEMBER

OPTICAL SCANNING AND IMAGE FORMING APPARATUS WITH A FREE-SLIDING UNIT FOR THERMAL EXPANSION

CROSS REFERENCE TO RELATED APPLICATIONS

The present application is based on and claims priority from Japanese Application Number 2008-048040, filed on Feb. 28, 2008, the disclosure of which is hereby incorporated by reference herein in its entirety.

BACKGROUND

1. Technical Field

The present invention relates to an optical scanning apparatus, an image-reading apparatus and an image-forming apparatus, in all of which the straightness of the caustic curve is stably maintained irrespective of the temperature changes, thereby keeping the bending of the scanning line to a minimum.

2. Related Art

In an image-forming apparatus using the Chester Carlson's process, there are performed the formation of latent images, development of the images and transfer of the images according to the rotation of a photoreceptor drum. In a multi-color image-forming apparatus in which a plurality of photoreceptor drums are disposed in a direction of transporting the medium on which an image is to be transferred, and in which the toner image formed in each color in each of the image-forming stations is overlapped with one other, there are the following disadvantages. In other words, due to the eccentricity or variation in diameter of each photoreceptor drum, there occurred deviations 1) in time from the latent image formation to the transferring, and 2) in the parallelism among the shafts of the respective photoreceptor drums of respective colors. Another disadvantage is that, due to 3) variation in the velocity of, or skew of, the medium on which the image is to be transferred, e.g., a transportation belt which transports the recording paper, there will occur resist deviation in the sub-scanning direction of each of the toner images, resulting in deterioration of image quality.

Similarly, also in an optical scanning apparatus, unless the writing position of the electrostatic latent image to be formed on the photoreceptor drum, and the parallelism among the scanning lines for scanning each of the photoreceptor drums are accurately aligned, there will occur a resist deviation or skew, resulting in color deviations or color changes.

Generally, the optical scanning apparatus is made up of: a light source having a semiconductor laser which is modulated by a predetermined pixel clock based on pixel data of the recording image; a polygon mirror which radially scans through deflection the light beams from the light source; and an optical scanning system having an fθ characteristic which forms the scanned optical beam into an image in spots on the surface of the photoreceptor drum and which arrays so that the distances among the adjacent spots of pixels become uniform. In order to reduce the cost and to secure high degree of freedom in the surface shape, the scanning lenses constituting the optical scanning system are nowadays made mostly of resin.

In this manner, the resin-formed optical system has a problem in that the rigidity of the system is low and therefore that deformation thereof is likely to take place due to stresses and temperature changes. As a solution, JP-A-2006-215397 discloses an art to use a supporting plate having a pair of receiving parts which are larger in rigidity than the optical element and which support the optical system, in the sub-scanning direction, near both end portions, as seen in the main scanning direction, of the optical system.

However, in the above-described arrangement of the prior art, if the free expansion of the optical element is not hampered, the straightness of the caustic curve can be stably maintained, thereby preventing the occurrence of bending of the scanning line. It is to be noted, however, that the rigid body member made of metallic plate work and the optical element made of resin have different coefficients of thermal expansion. Therefore, in case of a temperature change after initial adjustment or calibration, the adjusting screws, engagement parts for positioning, and pressurizing means will hamper or prevent free thermal expansion thereof. In this manner, the straightness of the caustic curve is deteriorated, thereby giving rise to bending of the scanning line.

SUMMARY

The invention has been made in view of the above problems and has an advantage of securing the straightness of the caustic curve even if the temperature changes occur, thereby preventing the occurrence of bending of the scanning lines.

According to the invention, there is provided an optical scanning apparatus comprising: a deflection unit that scans beams emitted from a plurality of laser light sources; an imaging unit having one or more optical elements for imaging beams scanned by the deflection unit; a supporting unit having a higher rigidity than a rigidity of the imaging unit, the supporting unit having a pair of receiving members that support the imaging unit, in a sub-scanning direction, near both ends, as seen in a main scanning direction, of the imaging unit; a bend-adjustment unit that corrects bend, the bend-adjustment units being disposed on the supporting unit at a plurality of positions along the main scanning direction; and a free-sliding unit that secures free expansion of the imaging unit due to temperature changes thereof.

According to another aspect of the invention, an optical scanning apparatus comprises: a deflection unit that scans beams emitted from a plurality of laser light sources; an imaging unit having one or more optical elements for imaging beams scanned by the deflection unit; a supporting unit made of a material whose difference in coefficient of thermal expansion from that of the optical element is within ±10%, the supporting unit having a pair of receiving elements for supporting the imaging unit, in a sub-scanning direction, near both ends, as seen in a main scanning direction, of the imaging unit: and a bend-adjustment unit that corrects bend, the bend-adjustment unit being disposed on the supporting unit at a plurality of positions along the main scanning direction; and a reinforcing member having a higher rigidity than a rigidity of the supporting unit, the reinforcing member being disposed on top of the supporting unit, the reinforcing member being slidable so as to keep a linearity of the supporting unit.

According to the invention, even if there is a temperature change, the straightness of the caustic curve can be stably maintained. Therefore, the bending of the scanning line can be prevented, whereby a high quality of image formation can be made which is free from color deviation and color change.

DETAILED DESCRIPTION OF THE PREFERRED EMBODIMENTS

Description will now be made of preferred embodiments of the invention with reference to the accompanying drawings.

Figure 7:
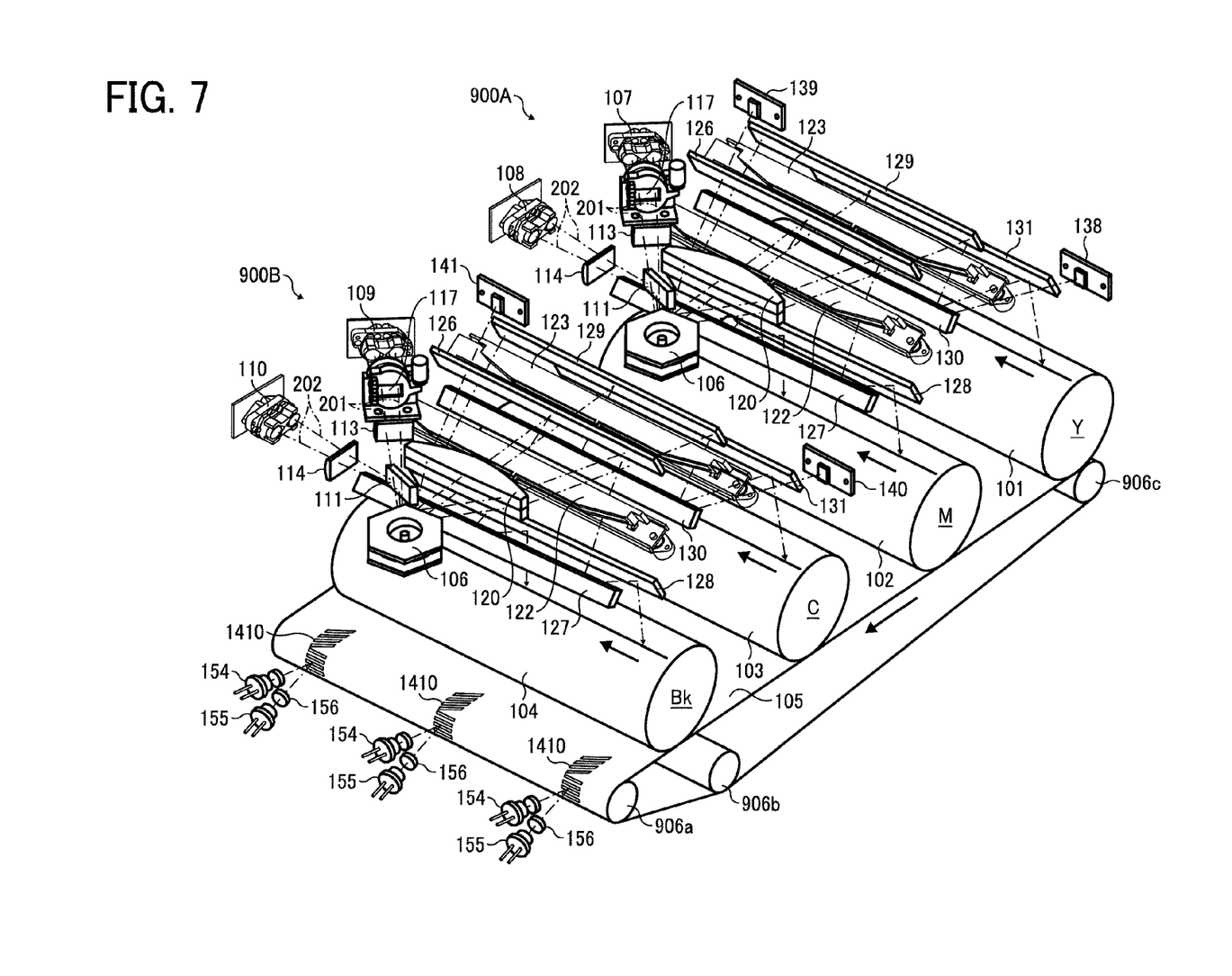
FIG. 7 is a perspective view showing an arrangement of an image-forming apparatus according to an example of the invention.
Figure 8:
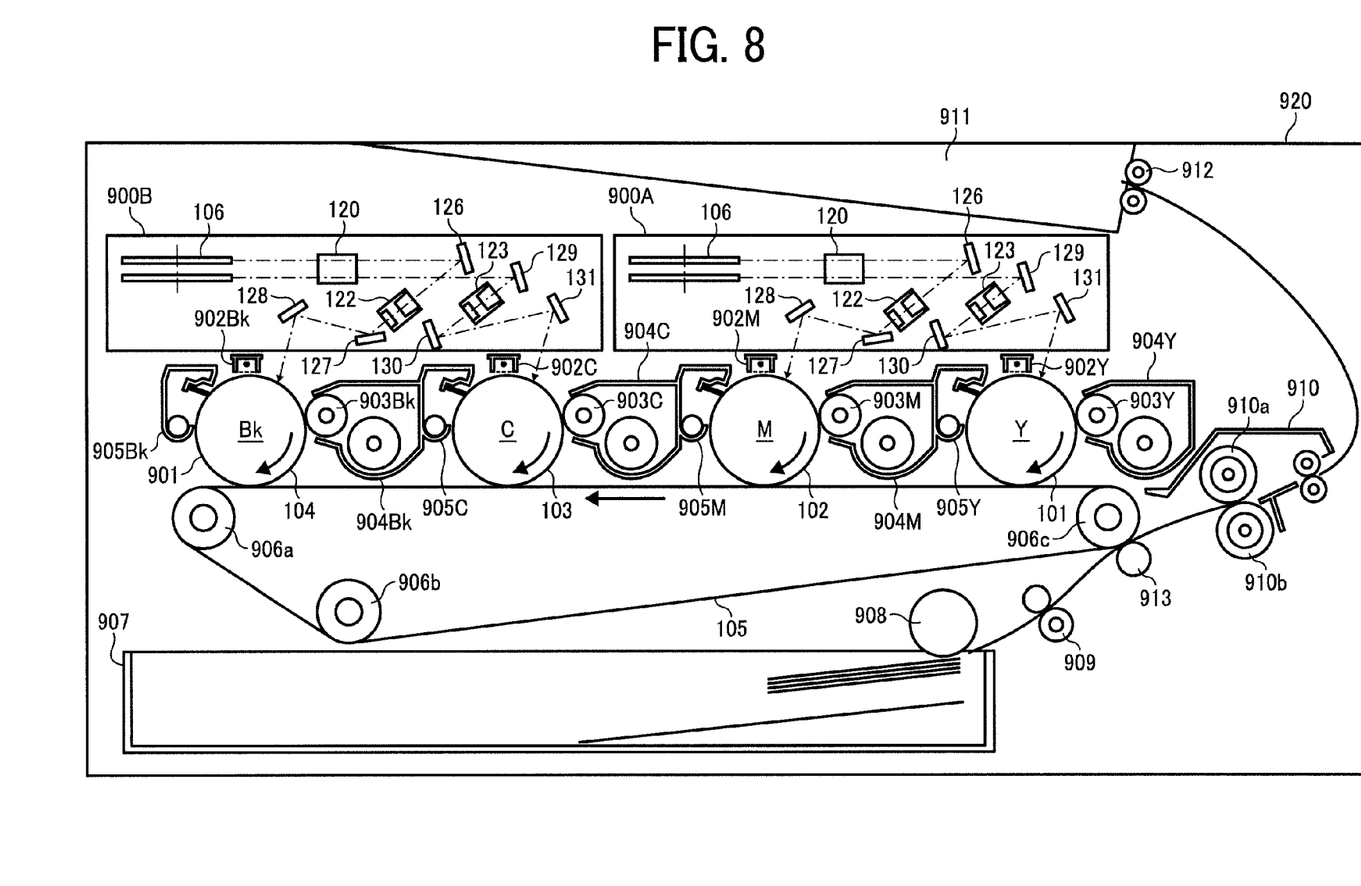
FIG. 8 is a schematic view showing an arrangement of an image-forming apparatus according to an example of the invention.

FIGS. 7 and 8 show an arrangement of a tandem type of color image-forming apparatus 920 having mounted thereon optical scanning apparatuses 900A, 900B. The color image-forming apparatus 920 has an intermediate transfer belt 105 as an intermediate transfer member. In the direction of movement of the transfer belt, there are disposed in parallel with one another each of the image-forming stations provided with photoreceptor drums 101, 102, 103, 104 as image-carrying members.

In the image-forming station having the photoreceptor drum 101, a toner image of yellow (Y) is formed, in the image-forming station having the photoreceptor drum 102, a toner image of magenta (M) is formed, in the image-forming station having the photoreceptor drum 103, a toner image of cyan (C) is formed, and in the image-forming station having the photoreceptor drum 104, a toner image of black (Bk) is formed, respectively.

Description will now be made, as a representative example, of the image-forming station for forming a toner image of yellow color. Around the photoreceptor drum 101 there are disposed: a charger 902Y which uniformly charges the surface of the photoreceptor drum 101 with electrostatic charges; a developing unit 904Y provided with a development roller 903Y which adheres the electrostatic image formed by the optical scanning apparatus 900A with charged toner to thereby visualize the image; a primary transfer roller (not illustrated) which is provided on the inside of the intermediate transfer belt 105 and which primarily transfers the toner image on the photoreceptor drum 101 to the intermediate transfer belt 105; and a cleaning means 905Y which scrapes off or sweeps the residual toner remaining on the photoreceptor drum 101 after transfer step. Since the other image-forming stations have similar constructions, the same numerals suffixed with alphabetical letters representing respective colors are attached to the equivalent elements, thereby omitting the descriptions of such elements. In the following description, alphabetical letters for respective colors are not attached, but they are treated as common constitution.

Latent images can simultaneously be formed in a plurality of lines (4 lines in the embodiment) on the photoreceptor drums 101, 102, 103, 104 by the scanning of one surface each of a polygon mirror 1. The intermediate transfer belt 105 is supported by extending over three rollers 906a, 906b, 906c and is rotated in counterclockwise direction. Each of the toner images in yellow, magenta, cyan, black is sequentially transferred to the intermediate transfer belt 105 in accordance with the timing so that a color image can be formed by overlapping them together.

The recording paper 10 as a sheet recording medium is fed by a paper feed roller 908 one at a time from the uppermost one out of a paper feed tray 907, and is sent out to the transfer section by the resist roller pair 909 at a timing of starting to record in the sub-scanning direction.

The color image that has been overlapped on the intermediate transfer belt 105 is transferred in a lump at the transfer section by the secondary transfer roller 913, which is a secondary transfer means, onto the recording paper 10. The recording paper 10 having transferred thereto the color image is sent to the fixing unit 910 that has a fixing roller 910a and a pressurizing roller 910b, thereby fixing the color image. The recording paper 10 having finished the fixing of the image is discharged by the discharge roller pair 912 to a discharge tray 911 which is formed above an upper surface of the image-forming apparatus main body, and is held in stack therein.

As shown in FIG. 7, there are provided the optical scanning apparatus 900A corresponding to the image-forming station for yellow and magenta and the optical scanning apparatus B corresponding to the image-forming station for cyan and black. In other words, a system is employed in which the units are arranged in parallel with each other with the scanning direction in alignment with each other. These optical scanning apparatuses 900A and 900B are the same in construction.

Four photoreceptor drums 101, 102, 103, 104 are disposed at an equal distance to one another along the traveling direction of the intermediate transfer belt 105. By sequentially transferring to thereby overlap the toner images of different colors, the color image is formed.

The optical scanning apparatus 900 to scan respective photoreceptor drums 101, 102, 103, 104 are respectively constituted in an integral manner, and scan optical beam by the polygon mirror as a polygonal rotating mirror. Since the direction of rotation of the polygon mirror 106 is the same, the image is written into each of the photoreceptor drums so that each of the write-in start positions coincide with each other. As a result of scanning by each surface of the polygon mirror, recording of the image can be made simultaneously for a plurality of lines.

A pair of semiconductor lasers as light sources is respectively disposed for each of the photoreceptor drums 101, 102, 103, 104. It is so arranged that scanning can be made simultaneously for two lines at a time by scanning in the sub-scanning direction while shifting by one line pitch depending on the recording concentration.

Since each of the optical scanning apparatuses 900A, 900B has the same construction, description will be made of only one of them. Optical beam 201, 202 from each of the light source units 107, 108 is disposed such that the portion at which the ejection position is different in the sub-scanning direction for each of the light source units, i.e., the ejection position of the light source units 107, 108 is different from each other by a predetermined height (6 mm in this embodiment). The beam from the light source unit 108 thus returns by an incidence mirror 111, and is incident into the polygon mirror 106 in close proximity, in the main scanning direction, to the beam from the light source unit 107 directly.

Each of cylinder lenses 113, 114 is disposed such that it has on one end a flat surface and on the other end a common curvature in the sub-scanning direction and that the length of the optical path to the deflection point of the polygon mirror 106 becomes equal to each other. Each of the light beams 201, 202 converges so as to become linear in the main scanning direction on the deflection surface. The combination thereof with a toroidal lens makes the deflection point and the surface of the photoreceptor into conjugating relationship in the sub-scanning direction, thereby constituting an optical face tangle error correction system.

Non-parallel plate 117 is made of a glass substrate whose one plane is slightly inclined in the main-scanning or sub-scanning direction. By rotating it about the optical axis, the relative scanning position is adjusted relative to the optical beam from the light source unit 107 which serves as a reference.

The polygon mirror 106 is a mirror having six surfaces and is constituted, in this embodiment, into two stages of an upper stage and a lower stage. A groove is formed such that an intermediate portion not used for deflection is made slightly smaller than the inscribed circle of the polygon mirror 106, thereby reducing windage loss.

The first layer of the polygon mirror 106 has a thickness of about 2 mm. The phases of the upper and lower polygon mirrors 106 are the same with each other. Each of fθ lenses 120 is integrally formed or adhered into two layers, each being formed into a noncircular surface shape empowered such that the beam moves on the photoreceptor surface in the main scanning direction at the same speed accompanied by the rotation of the polygon mirror 106. With the help of toroidal lenses 122, 123, as optical elements, which are to be provided for each of the beams, each of the beams is formed into an image in the shape of a spot on the surface of the photoreceptor, thereby recording the latent image.

Each color of stations (image-forming stations) is provided with a plurality of back to back mirrors, three pieces per one station in this embodiment, so that respective lengths of the optical path from the polygon mirror 106 to the surfaces of the photoreceptors, as the scanned surfaces, coincide with each other, and so that the position of incidence and angle of incidence become equal to each other relative to the respective photoreceptor drums 101, 102, 103, 104 which are disposed at an equal distance to one another.

Description will now be made of the optical path for each of the color stations. The light beam 201 from the light source unit 107 serving as a reference passes through the non-parallel flat plate 117 and the cylinder lens 113, and is then deflected on an upper stage of the polygon mirror 106. The light beam 201 thereafter passes through an upper layer of the fθ lens 120, is reflected on the back to back mirror 126 to thereby pass through the toroidal lens 122, is reflected on back to back mirrors 127, 128, is introduced into the photoreceptor drum 102, and forms a magenta image as the second image-forming station.

The light beam 202 from the light source unit 108 is reflected on the incidence mirror 111 through the cylinder lens 114. The light beam is then deflected on a lower stage of the polygon mirror 106, thereafter passes through a lower layer of the fθ lens 120, is reflected on a back to back mirror 129, passes through the toroidal lens 123, reflected on back to back mirrors 130, 131, and is introduced into the photoreceptor drum 101, and forms a yellow image as the first image-forming station.

The other optical scanning apparatus 900B also has the similar construction and, therefore, detailed description is omitted. In sum, the light beam from the light source 109 as a reference is introduced into the photoreceptor drum 104 to thereby form a black image as a fourth image-forming station. The light beam from the light source 110 is introduced into the photoreceptor drum 103 to thereby form a cyan image as the third image-forming station.

As described hereinabove, the color image-forming apparatus 920 forms an electrostatic latent image by the optical scanning apparatuses (900A, 900B) on a plurality of image carriers (photoreceptor drums 101-104), and develops the electrostatic latent image with different colors of toners (i.e., toners in yellow, magenta, cyan and black in color). The toner image formed on each of the image carriers is sequentially transferred by overlapping on the intermediate transfer body (intermediate transfer belt 105), and is then transferred in a lump to the sheet-like recording medium (recording paper 10), thereby obtaining a color image.

Further, each of the optical scanning apparatuses 900A, 900B has respectively: the light source means (light source units 107-110); the deflection means (polygon mirror 106) which scans the light beam from the light sources; and the image-forming means which forms an image on the scanned surface (photoreceptor drums 101-104) with the light beam scanned by the deflection means. The optical element (toroidal lens 122, 123) which constitutes the image-forming means and which has a force of convergence in at least the sub-scanning direction is rotated on a plane perpendicular to the optical axis. The inclination of the scanning line relative to the surface to be scanned can thus be made variable.

Figure 9:
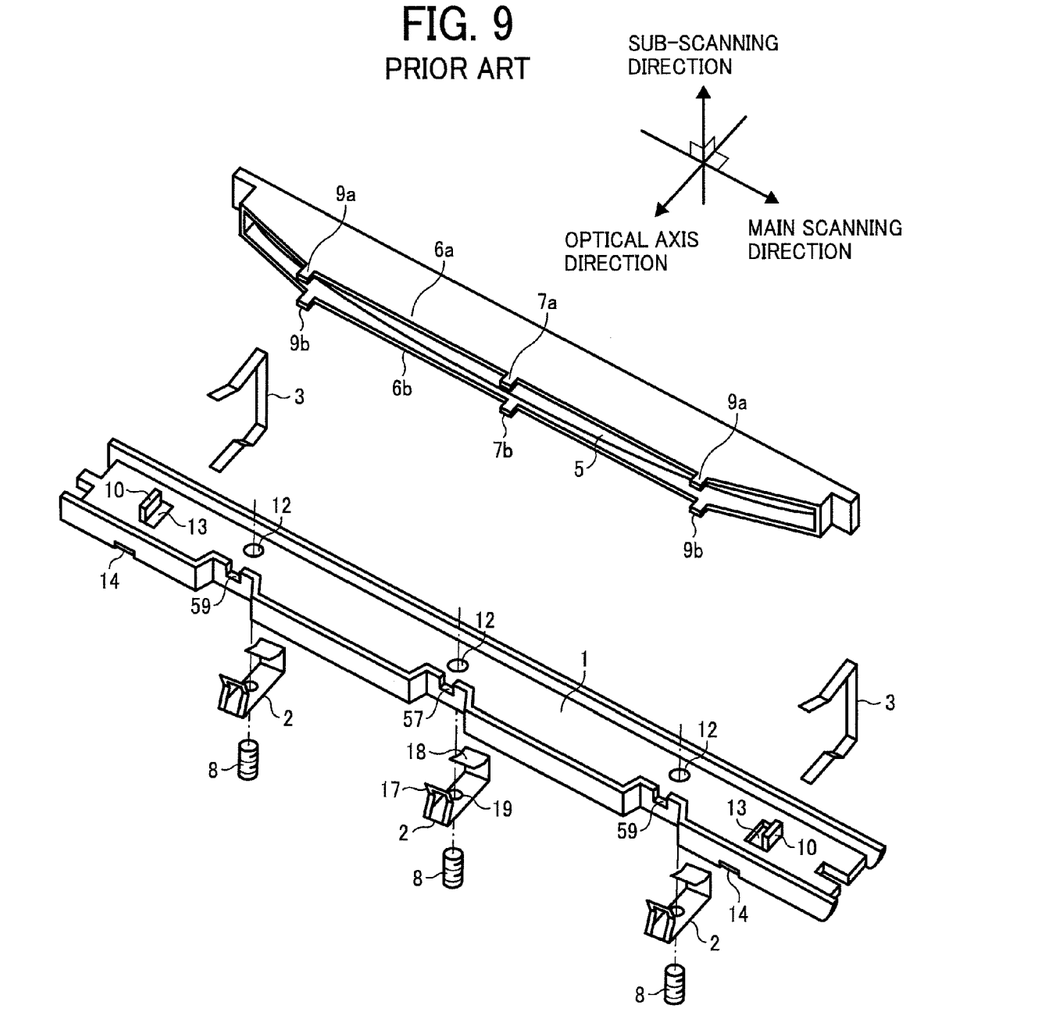
FIG. 9 is a perspective view showing the conventional optical scanning apparatus.

FIG. 9 is an exploded perspective view of a supporting case for the conventional optical element. The optical element 5 is made of resin and has formed rib parts 6a, 6b while maintaining a distance between the two in the sub-scanning direction so as to enclose the lens part therewith. In the central part of each of the rib parts as seen in the main scanning direction (longitudinal direction), there are provided projections 7a, 7b for positioning purpose. Further, there are also formed projections 9a, 9b for positioning purpose on both sides of the central parts.

The supporting plate 1, as a rigid member, which supports the optical element is made of a material having a higher rigidity than the rigidity of the optical element 5 and is formed, by sheet-metal working, into "U" shape (i.e., substantially into the shape of an alphabetical letter C) in cross-section. In the side-part bending portions which are provided in the supporting plate 1, there are formed notches 57, 59 which come into engagement with the projection 7a and the projection 9b formed in the rib part of the optical element 5.

The projections 7b, 9a are engaged with the notches 57, 59. The bottom surface of the rib portion 6b abuts and is positioned against a pair of erected bent portions 10 which are cut and erected near both end portions of the supporting plate 1 as seen in the main scanning direction. Thereafter, at portions which lie opposite to the erected bent portions 10, the optical element 5 is supported, by an elastic force of a pair of plate springs 3, on the supporting plate 1 in a manner in which the upper surface of the optical element 5 and the lower surface of the supporting plate 1 are sandwiched by the plate springs 3. Each of the erected bent portions 10 is a receiving portion which supports the optical element 5 in the sub-scanning direction of the supporting plate 1 at both end portions as seen in the main-scanning direction thereof. Due to the urging force of the plate spring 3, the lower surface of the optical element 5 surely comes into abutment with the erected bent portions 10 and is held thereby. The plate spring 3 is fitted from the outside in a state in which the optical element 5 is overlapped with the supporting plate 1. The lower end portion is protruded out of the opening 13 inward and is inserted into the opening 14 for fixing. The supporting plate 1 has formed therein three threaded holes 12 on the inside of the pair of erected bent portions 10, two at both ends as seen in the main scanning direction, and one in an intermediate position of the optical element 5. An adjusting screw 8 is inserted into each of the threaded holes 12 through a hole 19 formed in the central portion of each of the spring plates 2.

Each of the three plate springs 2 is caught from the outside of the supporting plate 1 and the optical element 5 into the inside of the lower side rib 6b of the optical element 5 at the peaked portion of the bent portion 18. Further, by engaging the opening of the bent portion 17 with the projections 7, 9, the plate spring 2 brings the lower surface of the lower-side rib 6b into abutment with the front end of the adjusting screw 8. The projections 7b, 9b are urged so as to abut with the notches 57, 59.

The optical element 5 is elongated and low in rigidity. Therefore, the slightest or smallest stress applied thereto will give rise to deflection (camber). In addition, if there is a temperature distribution (profile) in a vertical direction as a result of change in ambient temperature, deflection occurs also due to thermal expansion difference. However, by thus laying the optical element 5 along the supporting plate that is higher in rigidity than the optical element, the shape can be stably maintained. Even if a local stress is applied at the time of inclination adjustment as described hereinafter, there is no possibility of deforming the optical element (linearity of the generating line can thus be maintained).

Figure 1:
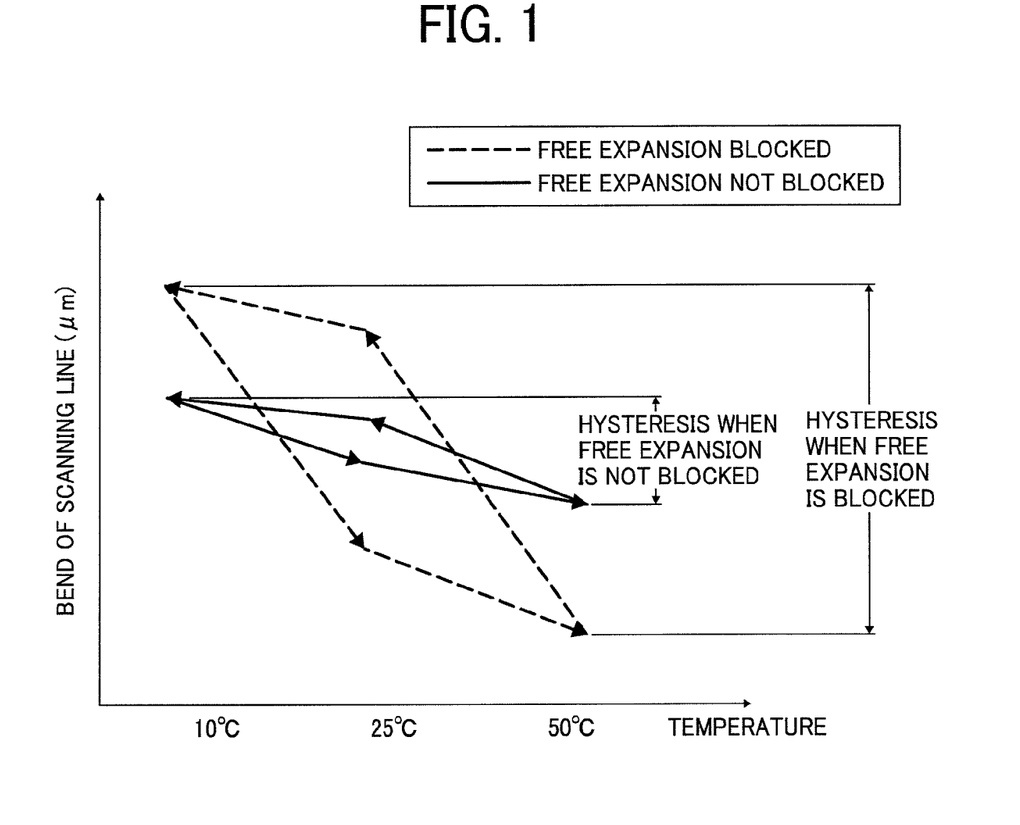
FIG. 1 is a diagram showing the relationship between the temperature change and the bending of the scanning line.

Coefficient of thermal expansion of polycarbonate resin to be used as the optical element is 7E-5 (/° C.). In case steel is used in the supporting member, the coefficient of thermal expansion of steel is 1.2E-5 (/° C.). Therefore, in the above-described conventional optical scanning apparatus, the supporting member in contact with the optical element, the plate spring which is a bend-adjustment means, and contact end portions of adjusting screws are likely to cut (or bite) into the optical element due to temperature difference. As a result, free expansion of the optical element is prevented. FIG. 1 shows a graph illustrating the bending of scanning line versus temperature changes. In the figure, the dotted path shows a hysteresis in the conventional apparatus. As shown, due to blocking or hampering of free expansion, the bending of the scanning line can be seen to be largely dependent on the temperature changes. The solid line in the figure, on the other hand, shows the result in the optical scanning apparatus in which the invention is applied to thereby remove the blocking or hampering of free expansion. In this manner, depending on the difference in free expansion of the optical element, about three times of difference will occur in the change of bending of the scanning line between the state of 50° C.→25° C. and the state of 10° C.→25° C. in the same state at 25° C.

Figure 2:
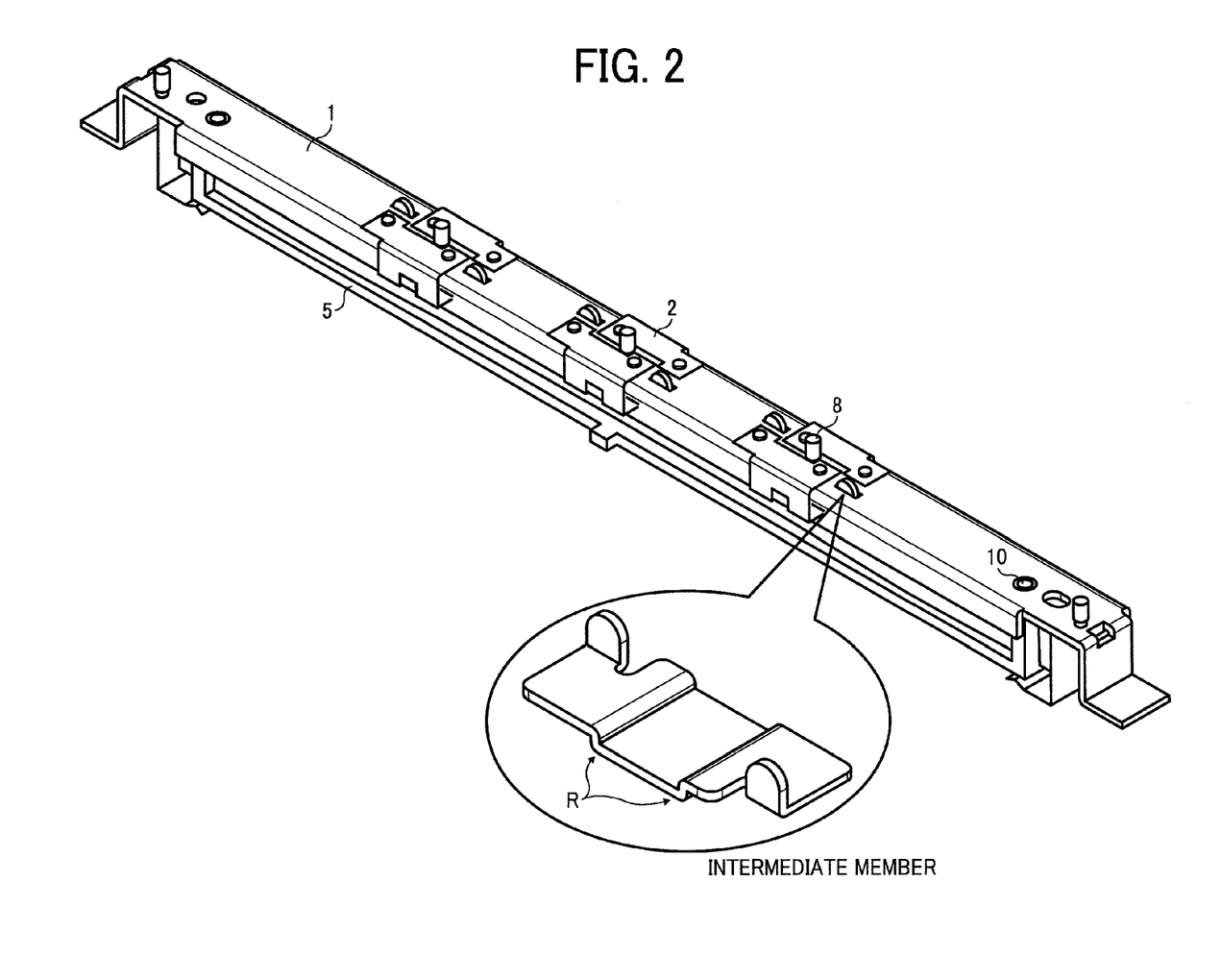
FIG. 2 is perspective view showing the constitution of an optical scanning apparatus according to an example of the invention.
Figure 3:
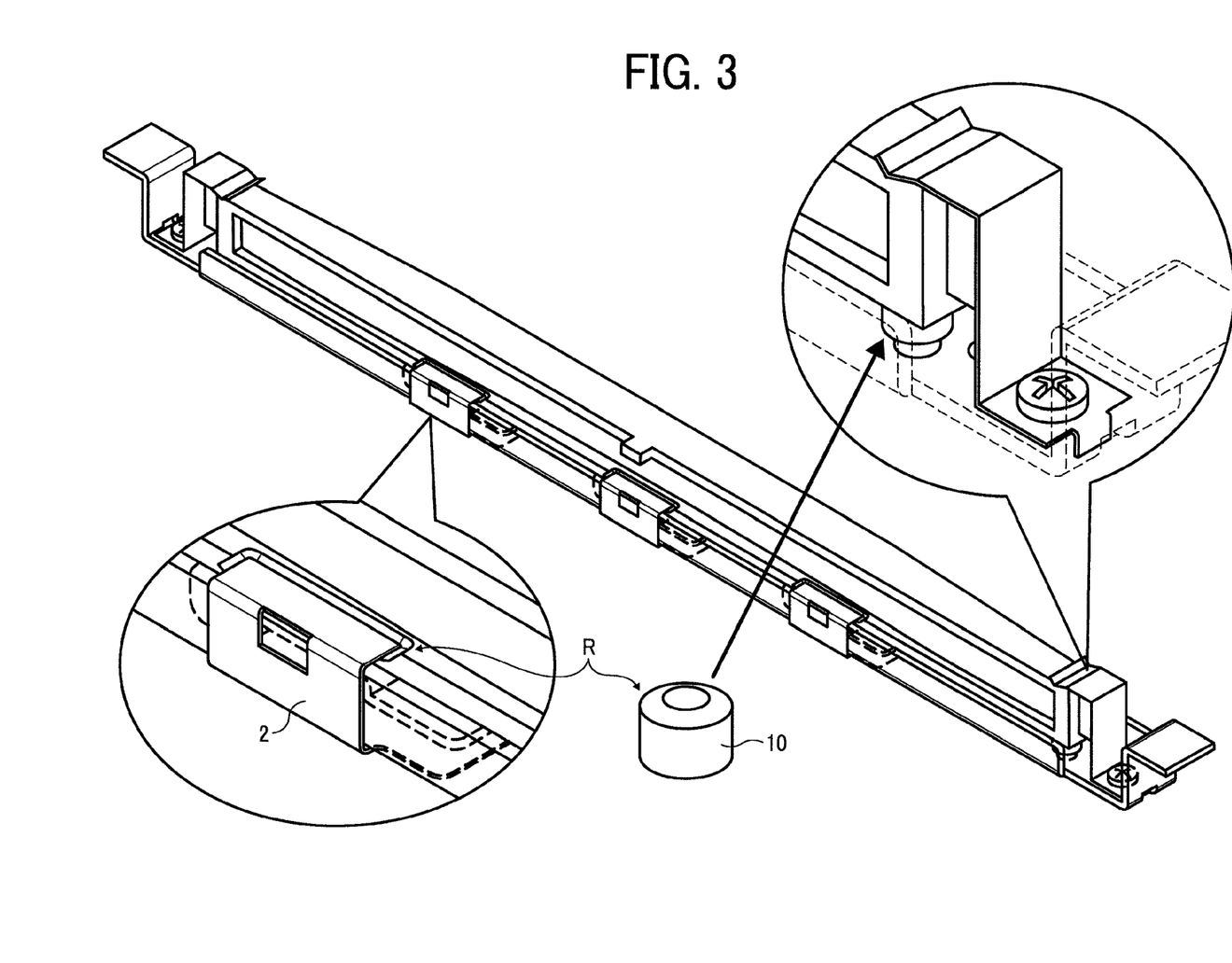
FIG. 3 is a perspective view showing the sliding means of the optical scanning apparatus according to an example of the invention.

As a method of preventing the free expansion from being blocked or hampered, there will be one as shown in FIG. 2. In other words, in order for the adjusting screws not to come into direct contact with the optical element, an intermediate member is disposed between the adjusting screws and the optical element. The intermediate member is further provided with rounded corners R. In this arrangement, the plate-work edges are arranged not to come into contact with the optical element. In addition, as shown in FIG. 3, rounded corners are provided at the contact portions of the plate spring and the supporting member to thereby prevent the edges from cutting (or biting) into the optical element.

Figure 4:
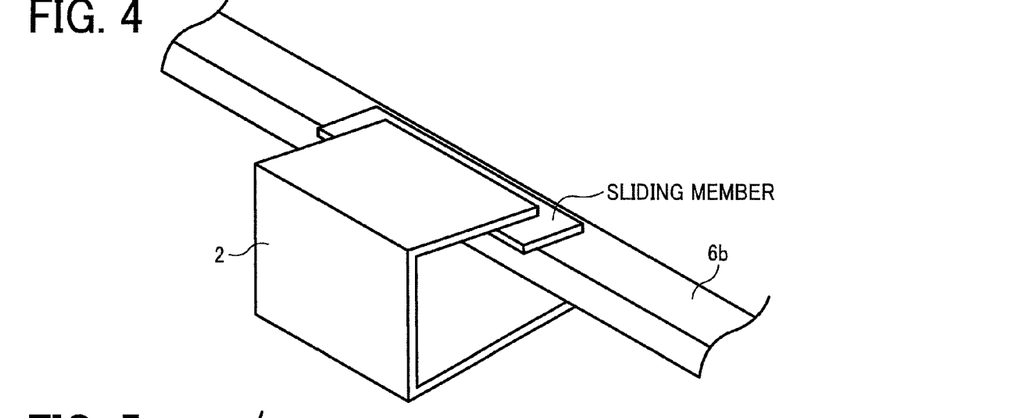
FIG. 4 is a perspective view showing the sliding means of the optical scanning apparatus according to an example of the invention.
Figure 5:
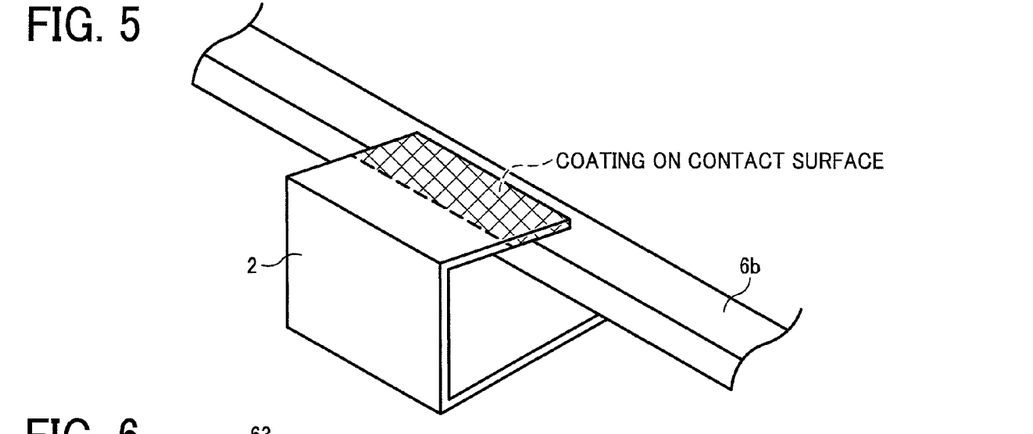
FIG. 5 is a perspective view showing the sliding means of the optical scanning apparatus according to an example of the invention.

Further, as shown in FIG. 4, the blocking or hampering of the free expansion can also be avoided by holding (or pinching) the sliding member by the contact portions. In case the sliding member is a metallic plate, the friction coefficient μ thereof is about 0.4 and, when a lubricant is used, μ will be about 0.1. As shown in FIG. 5, the contact portion may alternatively be subjected to coating. In case the contact portion is coated, e.g., with fluorine resin, the friction coefficient μ is about 0.1, with the result that the optical element can be smoothly operated. Description has been made only of the plate spring portions with reference to FIGS. 4 and 5, but this art can be applied to all of the other contact portions.

Figure 6:
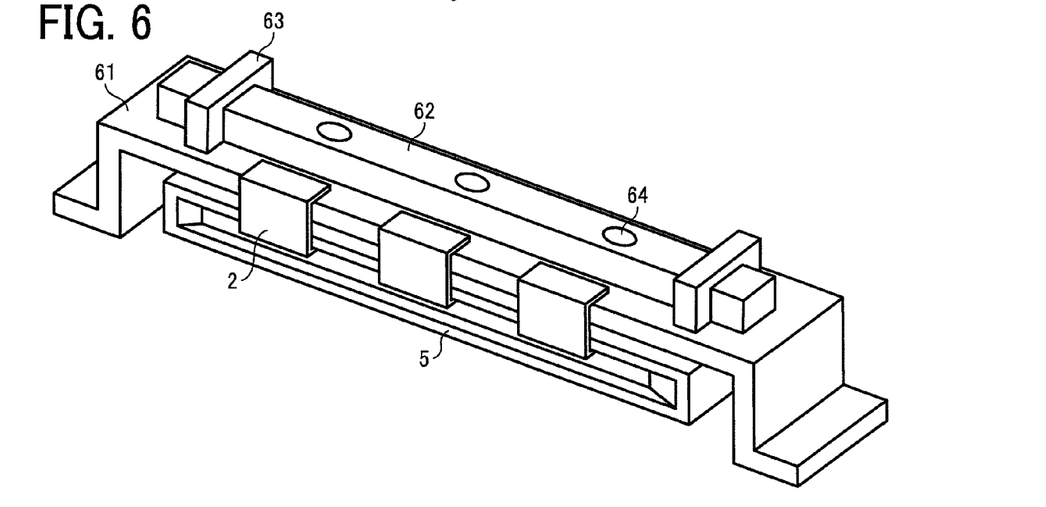
FIG. 6 is a perspective view showing the sliding means of the optical scanning apparatus according to one example of the invention.

As still another method, it is also possible to allow the optical element to freely expand by forming supporting member in polycarbonate (PC) resin, ABS resin, polystyrene (PS) resin, acrylic (PMMA) resin and the like which are about ±10% in the difference in coefficient of thermal expansion as compared with that of the optical element. In this manner, the optical element can freely be thermally expanded. As described above, as the supporting member, there is used a material which is small in the difference in coefficient of thermal expansion as compared with that of the optical element. As a result, even in case where a temperature change takes place, they expand and contract by the same amounts. Therefore, no stress will be applied due to thermal expansion, with the result that the amount of bending change is small in the scanning line. In addition, since there is little or no effect of frictional force with the contact portion, it is possible to further reduce the bending change of the scanning line. However, in this embodiment since the resin to be used as the supporting member is smaller in rigidity as compared with steel, it is difficult to secure the linearity of the generating line of the optical element. As a solution, as shown in FIG. 6, a metallic block 62 for reinforcement purpose may be disposed on the supporting member 61. At this time, care should be taken to make the supporting member and the reinforcing member freely slidable so that the reinforcing member does not hinder the free sliding.

As described hereinabove, it is preferable that the free-sliding unit is so arranged that the supporting unit or the bend-adjustment unit has a curvature of above R 0.5 at a portion where the imaging unit comes into contact with one of the supporting unit and the bend-adjustment unit.

Preferably, the free-sliding unit is a sliding member whose coefficient of friction is below 0.4. The sliding member is pinched at a portion where the imaging unit contacts the supporting unit or the bend-adjustment unit.

Preferably, the free-sliding unit is a coating whose coefficient of friction is below 0.4 at a portion where the imaging unit contacts the supporting unit or the bend-adjustment unit.

Preferably, the supporting unit is constituted by a resin.

Preferably, the image-reading apparatus comprises the optical scanning apparatus.

Preferably, the image-forming apparatus comprises the image-reading apparatus.

Although the invention has been fully described in connection with the preferred embodiments thereof with reference to the accompanying drawings, it is to be noted that various changes and modifications are apparent to those skilled in the art. Accordingly, the preferred embodiments of the invention as set forth above are intended to be illustrative, not limiting. Various changes to the invention may be made without departing from its true spirit and scope as defined in the following claims.

What is claimed is:

1. An optical scanning apparatus comprising:
a deflection unit that scans beams emitted from a plurality of laser light sources;
an imaging unit having one or more optical elements for imaging beams scanned by the deflection unit;
a supporting unit disposed to extend along a main-scanning direction, the supporting unit having a higher rigidity than a rigidity of the imaging unit, the supporting unit having a pair of receiving members that support the imaging unit, in a sub-scanning direction, near both ends, as seen in a main scanning direction, of the imaging unit;
a bend-adjustment unit having a plurality of height adjusters configured to adjust a height of the imaging unit relative to the supporting unit, the bend-adjustment unit being configured to correct bend of the imaging unit by height adjustment with the height adjusters, the bend-adjustment unit being disposed on the supporting unit at a plurality of positions along the main scanning direction; and
a free-sliding unit configured to enable sliding between at least one of the supporting unit and the bend-adjustment unit and the imaging unit in deformation of the imaging unit so as to secure the deformation of the imaging unit due to temperature changes thereof; and
wherein the free-sliding unit is located between one of the height adjusters and the imaging unit, and wherein the free-sliding unit is configured to engage the supporting unit to align the free-sliding unit relative to the imaging unit; and
wherein the free-sliding unit has a central portion that comes into contact with the one of the height adjusters and the imaging unit, the free-sliding unit has end portions for engaging the supporting unit, the central portion is located between the end portions along the main scanning direction, the end portions are spaced apart from the imaging unit, and the free-sliding unit has a curvature of above R 0.5 at portions between the central portion and the end portions.

2. The optical scanning apparatus according to claim 1, wherein the free-sliding unit is a sliding member whose coefficient of friction is below 0.4.

3. The optical scanning apparatus according to claim 1, further comprising a device for biasing the imaging unit toward the one of the height adjusters, and a low friction surface between the biasing device and the imaging unit.

4. The optical scanning apparatus according to claim 3, wherein the biasing device includes a plate spring, and wherein the optical scanning apparatus further comprises a low friction sliding member located between the plate spring and the imaging unit.

5. The optical scanning apparatus according to claim 3, wherein the biasing device includes a plate spring, the plate spring includes a contact surface facing the imaging unit, and the contact surface has a low friction coating.

6. The optical scanning apparatus according to claim 1, wherein the supporting unit is constituted by a resin.

7. An image-reading apparatus comprising the optical scanning apparatus according to claim 1.

8. An image-forming apparatus comprising the image-reading apparatus according to claim 7.

9. The optical scanning apparatus according to claim 1, wherein the supporting unit has openings, and portions of the end portions of the free-sliding unit extend into the openings to engage the supporting unit to align the free-sliding unit relative to the imaging unit.

* * * * *